United States Patent [19]

Bergmann et al.

[11] Patent Number: 4,751,288
[45] Date of Patent: Jun. 14, 1988

[54] AZO DYES CONTAINING 2-AMINO-3-CYANO-5-FORMYLTHIOPHENE DERIVATIVES AS DIAZO COMPONENTS AND SUBSTITUTED ANILINE COMPOUNDS AS COUPLING COMPONENTS

[75] Inventors: Udo Bergmann, Darmstadt; Erwin Hahn, Heidelberg; Guenter Hansen, Ludwigshafen; Helmut Reichelt, Niederkirchen, all of Fed. Rep. of Germany

[73] Assignee: BASF Aktiengesellschaft, Ludwigshafen, Fed. Rep. of Germany

[21] Appl. No.: 843,397

[22] Filed: Mar. 24, 1986

[30] Foreign Application Priority Data

Oct. 4, 1985 [DE] Fed. Rep. of Germany ....... 3512760

[51] Int. Cl.⁴ .................... C09B 29/033; C09B 29/09; D06P 1/18; D06P 3/54
[52] U.S. Cl. .................................... 534/791; 534/573; 534/753; 534/887
[58] Field of Search ................ 534/753, 791

[56] References Cited

U.S. PATENT DOCUMENTS 4,264,495 4/1981 Maher et al. .................. 534/753
4,507,407 3/1985 Kluger et al. ................ 534/753 X

FOREIGN PATENT DOCUMENTS 0036081 9/1981 European Pat. Off. ............ 534/791
3427200 1/1986 Fed. Rep. of Germany ...... 534/791
1394365 5/1975 United Kingdom ................ 534/753
1583377 1/1981 United Kingdom ................ 534/791
2125424 3/1984 United Kingdom ................ 534/753

OTHER PUBLICATIONS

Research Disclosure 19826 (Oct. 1980), Seiten 425–427, Artikel Nr. 19826; "Discharge/Resist Printing of Synthetic Textile Materials Using Thiophene-Azo Disperse Dyestuffs in the Presence of Alkali", Spalten 1,2,3.

Primary Examiner—Floyd D. Higel
Attorney, Agent, or Firm—Oblon, Fisher, Spivak, McClelland & Maier

[57] ABSTRACT

The compounds of the formula I

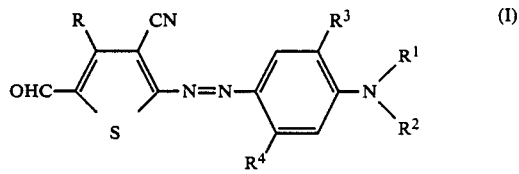

where R is unsubstituted or substituted phenyl or naphthyl, $R^1$ and $R^2$ are each unsubstituted or substituted alkyl, alkenyl or cycloalkyl, and one of the radicals may furthermore be hydrogen, $R^3$ is hydrogen, methyl, methoxy, ethoxy or chlorine, and $R^4$ is acylamino, are particularly useful for dyeing polyesters.

2 Claims, No Drawings

AZO DYES CONTAINING 2-AMINO-3-CYANO-5-FORMYLTHIOPHENE DERIVATIVES AS DIAZO COMPONENTS AND SUBSTITUTED ANILINE COMPOUNDS AS COUPLING COMPONENTS

The present invention relates to compounds of general formula I

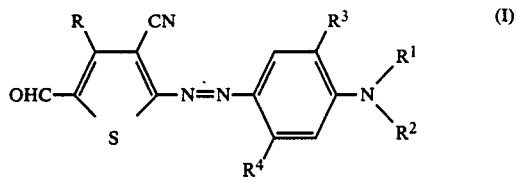 (I)

where R is unsubstituted or substituted phenyl or naphthyl, $R^1$ and $R^2$ are each unsubstituted or substituted alkyl, alkenyl or cycloalkyl, and one of the radicals may furthermore be hydrogen, $R^3$ is hydrogen, methyl, methoxy, ethoxy or chlorine and $R^4$ is acylamino.

The radicals R may be substituted by, for example, fluorine, chlorine, bromine, trifluoromethyl, $C_1$–$C_4$-alkyl or -alkoxy, nitro or cyano, chlorine, methyl and methoxy being preferred.

$R^1$ and $R^2$ are each, for example, $C_1$–$C_6$-alkyl which may furthermore be substituted by hydroxyl, $C_1$–$C_4$-alkoxy, phenoxy, phenyl, cyano, alkanoyl, alkanoyloxy, alkoxycarbonyl, aroyloxy, alkoxycarbonyloxy, alkylaminocarbonyloxy, arylaminocarbonyloxy or alkoxy-alkoxy, or are each $C_2$–$C_4$-alkenyl or $C_5$–$C_7$-cycloalkyl.

Specific examples of radicals $R^1$ and $R^2$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-β-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl and 2-benzoylethyl, and one of the radicals may furthermore be hydrogen.

Examples of suitable radicals $R^4$ are unsubstituted or substituted $C_1$–$C_6$-alkanoylamino, unsubstituted or substituted benzoylamino and $C_1$–$C_4$-alkylsulfonylamino or -dialkylaminosulfonylamino.

Specific examples of radicals $R^4$ are methylcarbonylamino, ethylcarbonylamino, n- and isopropylcarbonylamino, n-, iso- and sec-butylcarbonylamino, benzylcarbonylamino, benzoylamino, o-, m- and p-methylbenzoylamino, o-, m- and p-chlorobenzoylamino, o-, m- and p-methoxybenzoylamino, o-, m- and p-nitrobenzoylamino, methylsulfonylamino, ethylsulfonylamino, propylsulfonylamino, methoxymethylcarbonylamino and ethoxy-, phenoxy-, cyano-, chloro- and bromomethylcarbonylamino.

The compounds of the formula I can be prepared by reacting a diazonium salt of a compound of the formula I

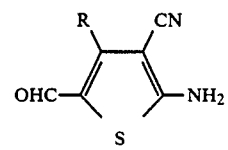

with a coupling component of the formula

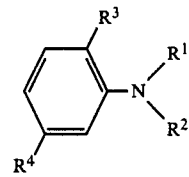

by a conventional method. The Examples which follow illustrate the preparation. Parts and percentages are by weight, unless stated otherwise.

The compounds of the formula I are preferably used for dyeing synthetic polyesters; essentially blue hues are obtained, some of them possessing very good fastness properties.

Of particular importance are compounds of the formula I in which R is phenyl which is unsubstituted or substituted by chlorine, bromine, methyl, ethyl, methoxy or ethoxy, $R^1$ and $R^2$ are each allyl, benzyl, phenylethyl or $C_1$–$C_4$-alkyl which is unsubstituted or substituted by hydroxyl, cyano, $C_1$–$C_4$-alkanoyloxy, $C_1$–$C_4$-alkoxycarbonyl or $C_1$–$C_4$-alkoxy, and one of the radicals may furthermore be hydrogen, $R^3$ is hydrogen, methyl, methoxy or ethoxy and $R^4$ is $C_1$–$C_4$-alkanoylamino, methoxy-, ethoxy-, phenoxy-, cyano- or chloromethylcarbonylamino, $C_1$–$C_4$-alkylsulfonylamino or benzoylamino.

EXAMPLE 1

22.8 parts of 2-amino-3-cyano-4-phenyl-5-formylthiophene were introduced into a mixture of 150 parts by volume of glacial acetic acid/propionic acid (3:1) and 50 parts by volume of 85% strength sulfuric acid. 17.5 parts by volume of nitrosylsulfuric acid (11.5% of $N_2O_3$) were added dropwise at 0°–5° C., after which the mixture was stirred for 4 hours at this temperature.

24.6 parts of 3-diethylaminoacetanilide were dissolved in 100 parts by volume of dimethylformamide, and the solution was added to 250 parts of water, 50 parts by volume of 32% strength hydrochloric acid, 1000 parts of ice and 2.5 parts of amidosulfonic acid. The diazo solution obtained beforehand was added in the course of 0.5 hour, with external cooling with ice/water, and the mixture was stirred for 4 hours at 0°–5° C. and overnight without further cooling. The product was filtered off under suction, washed neutral with water and dried at 60° C. in a drying oven under reduced pressure to give 38 parts of a blueish black powder of the formula

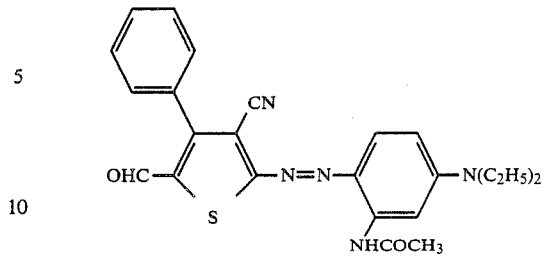

which dyes polyesters in fast blue hues.

The dyes defined in the Table below were obtained by a similar method.

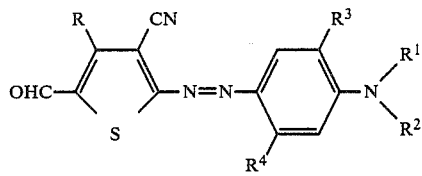

| Example No. | R | $R^1$ | $R^2$ | $R^3$ | $R^4$ | Color on PES |
|---|---|---|---|---|---|---|
| 2 | $C_6H_5$ | $CH_2CH=CH_2$ | $CH_2CH=CH_2$ | H | $NHCOCH_3$ | blue |
| 3 | $C_6H_5$ | $CH_2CH=CH_2$ | $CH_2CH=CH_2$ | H | $NHCOC_6H_5$ | blue |
| 4 | $C_6H_5$ | $C_2H_5$ | $C_2H_5$ | H | $NHCOC_6H_5$ | blue |
| 5 | $C_6H_5$ | $C_4H_9(n)$ | $C_4H_9(n)$ | H | $NHCOCH_3$ | blue |
| 6 | $C_6H_5$ | $C_6H_{13}(n)$ | $C_6H_{13}(n)$ | H | $NHCOCH_3$ | blue |
| 7 | $C_6H_5$ | $C_2H_4OCOCH_3$ | $C_2H_4OCOCH_3$ | H | $NHCOCH_3$ | blueish violet |
| 8 | $C_6H_5$ | $C_2H_4OCOCH_3$ | $C_2H_4OCOCH_3$ | H | $NHCOC_6H_5$ | blueish violet |
| 9 | $C_6H_5$ | $C_2H_4CN$ | $CH_2CH=CH_2$ | H | $NHCOC_6H_5$ | blueish violet |
| 10 | $C_6H_5$ | $C_2H_4CN$ | $C_4H_9(n)$ | H | $NHCOC_6H_5$ | blue |
| 11 | $C_6H_5$ | $C_2H_4CN$ | $C_2H_4OCOCH_3$ | H | $NHCOC_6H_5$ | blueish violet |
| 12 | $C_6H_5$ | $C_2H_4OCH_3$ | $C_2H_4CN$ | H | $NHCOCH_3$ | blue |
| 13 | $C_6H_5$ | $CH_2CO_2CH_3$ | $CH_2CO_2CH_3$ | $CH_3$ | $NHSO_2CH_3$ | blueish violet |
| 14 | $C_6H_5$ | H | $C_2H_4CO_2C_2H_4OC_6H_5$ | H | $NHCOCH_3$ | blueish violet |
| 15 | $C_6H_5$ | H | $C_2H_4OC_2H_5$ | Cl | $NHCOCH_3$ | blue |
| 16 | $C_6H_5$ | $C_2H_4CN$ | $CH_2CH=CH_2$ | $OCH_3$ | $NHCOCH_3$ | greenish blue |
| 17 | $C_6H_5$ | $C_2H_4COCH_3$ | $C_2H_4CO_2CH_3$ | H | $NHCOCH_3$ | violet |
| 18 | $C_6H_5$ | $C_2H_4OH$ | $C_2H_4CO_2CH_3$ | H | $NHCOCH_3$ | blue |
| 19 | $C_6H_5$ | $C_2H_4OH$ | $CH_2C_6H_5$ | H | $NHCOCH_3$ | blue |
| 20 | $C_6H_5$ | $C_2H_4OCOCH_3$ | $CH_2C_6H_5$ | H | $NHCOCH_3$ | blue |
| 21 | $C_6H_5$ | $CH_2CH=CH_2$ | $CH_2CH=CH_2$ | $OCH_3$ | $NHCOCH_3$ | greenish blue |
| 22 | $C_6H_5$ | $C_2H_4OCOCH_3$ | $C_2H_4OCOCH_3$ | $OCH_3$ | $NHCOCH_3$ | greenish blue |
| 23 | $C_6H_5$ | H | $C_2H_4CO_2C_4H_9(n)$ | $OCH_3$ | $NHCOCH_3$ | greenish blue |
| 24 | $C_6H_5$ | H | $C_2H_4CO_2C_2H_4OC_4H_9$ | H | $NHCOCH_3$ | reddish blue |
| 25 | $p-CH_3O-C_6H_4$ | $C_2H_5$ | $C_2H_5$ | H | $NHCOCH_3$ | blue |
| 26 | $p-CH_3O-C_6H_4$ | $CH_2CH=CH_2$ | $CH_2CH=CH_2$ | H | $NHCOCH_3$ | blue |
| 27 | $p-CH_3O-C_6H_4$ | $C_4H_9(n)$ | $C_4H_9(n)$ | H | $NHCOCH_3$ | blue |
| 28 | $p-CH_3O-C_6H_4$ | $C_6H_{13}(n)$ | $C_6H_{13}(n)$ | H | $NHCOCH_3$ | blue |
| 29 | $p-CH_3O-C_6H_4$ | $CH_2CH=CHCl$ | $CH_2CH=CHCl$ | H | $NHCOCH_3$ | reddish blue |
| 30 | $p-CH_3O-C_6H_4$ | $C_2H_4CN$ | $C_4H_9(n)$ | H | $NHCOC_6H_5$ | blue |
| 31 | $p-CH_3O-C_6H_4$ | $C_2H_4OCOCH_3$ | $C_2H_4OCOCH_3$ | H | $NHCOC_6H_5$ | reddish blue |
| 32 | $p-CH_3O-C_6H_4$ | $C_2H_4CN$ | $CH_2CH=CH_2$ | $OCH_3$ | $NHCOCH_3$ | greenish blue |
| 33 | $p-CH_3O-C_6H_4$ | $CH_2CH=CH_2$ | $CH_2CH=CH_2$ | $OCH_3$ | $NHCOCH_3$ | greenish blue |
| 34 | $p-Cl-C_6H_4$ | $C_2H_5$ | $C_2H_5$ | H | $NHCOCH_3$ | blue |
| 35 | $p-Cl-C_6H_4$ | $CH_2CH=CHCl$ | $CH_2CH=CHCl$ | H | $NHCOCH_3$ | reddish blue |
| 36 | $p-Cl-C_6H_4$ | $C_6H_{13}(n)$ | $C_6H_{13}(n)$ | H | $NHCOCH_3$ | blue |
| 37 | $p-Cl-C_6H_4$ | $C_2H_4OCOCH_3$ | $C_2H_4OCOCH_3$ | H | $NHCOCH_3$ | blueish violet |
| 38 | $p-Cl-C_6H_4$ | $C_2H_4CN$ | $C_2H_4OCOCH_3$ | H | $NHCOC_6H_5$ | blueish violet |
| 39 | $p-Cl-C_6H_4$ | $C_2H_4CN$ | $CH_2CH=CH_2$ | $OCH_3$ | $NHCOCH_3$ | greenish blue |
| 40 | $p-Cl-C_6H_4$ | $CH_2CH=CH_2$ | $CH_2CH=CH_2$ | $OCH_3$ | $NHCOCH_3$ | greenish blue |
| 41 | $p-CH_3-C_6H_4$ | $C_2H_5$ | $C_2H_5$ | H | $NHCOCH_3$ | blue |
| 42 | $p-CH_3-C_6H_4$ | $CH_2CH=CH_2$ | $CH_2CH=CH_2$ | H | $NHCOCH_3$ | blue |
| 43 | $p-CH_3-C_6H_4$ | $C_4H_9(n)$ | $C_4H_9(n)$ | H | $NHCOCH_3$ | blue |
| 44 | $p-CH_3-C_6H_4$ | $C_6H_{13}(n)$ | $C_6H_{13}(n)$ | H | $NHCOCH_3$ | blue |
| 45 | $p-CH_3-C_6H_4$ | $CH_2CH=CH_2$ | $CH_2CH=CH_2$ | H | $NHCOC_2H_5$ | blue |

-continued

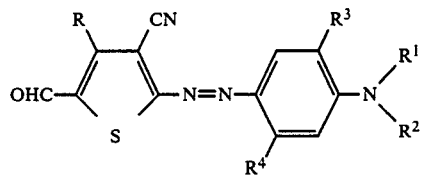

| Example No. | R | R$^1$ | R$^2$ | R$^3$ | R$^4$ | Color on PES |
|---|---|---|---|---|---|---|
| 46 | p-CH$_3$—C$_6$H$_4$ | C$_2$H$_4$CN | CH$_2$CH=CH$_2$ | OCH$_3$ | NHCOCH$_3$ | greenish blue |
| 47 | p-CH$_3$—C$_6$H$_4$ | C$_2$H$_4$OCOCH$_3$ | C$_2$H$_4$OCOCH$_3$ | OCH$_3$ | NHCOCH$_3$ | greenish blue |
| 48 | o,p-(CH$_3$)$_2$—C$_6$H$_3$ | C$_2$H$_5$ | C$_2$H$_5$ | H | NHCOCH$_3$ | blue |
| 49 | o,p-(CH$_3$)$_2$—C$_6$H$_3$ | C$_4$H$_9$(n) | C$_4$H$_9$(n) | H | NHCOCH$_3$ | blue |
| 50 | o,p-(CH$_3$)$_2$—C$_6$H$_3$ | CH$_2$CH=CH$_2$ | CH$_2$CH=CH$_2$ | H | NHCOCH$_3$ | blue |
| 51 | o,p-(CH$_3$)$_2$—C$_6$H$_3$ | C$_6$H$_{13}$(n) | C$_6$H$_{13}$(n) | H | NHCOCH$_3$ | blue |
| 52 | o,p-(CH$_3$)$_2$—C$_6$H$_3$ | C$_2$H$_4$OCOCH$_3$ | C$_2$H$_4$OCOCH$_3$ | H | NHCOC$_6$H$_5$ | blue |
| 53 | o,p-(CH$_3$)$_2$—C$_6$H$_3$ | C$_2$H$_4$CN | CH$_2$CH=CH$_2$ | OCH$_3$ | NHCOCH$_3$ | blue |
| 54 | naphthyl | C$_2$H$_5$ | C$_2$H$_5$ | H | NHCOCH$_3$ | blue |
| 55 | naphthyl | C$_4$H$_9$(n) | C$_4$H$_9$(n) | H | NHCOCH$_3$ | blue |
| 56 | naphthyl | C$_6$H$_{13}$(n) | C$_6$H$_{13}$(n) | H | NHCOCH$_3$ | blue |
| 57 | C$_6$H$_5$ | C$_2$H$_5$ | C$_2$H$_5$ | H | NHCOCH$_2$OCH$_3$ | blue |
| 58 | C$_6$H$_5$ | C$_3$H$_7$(n) | C$_3$H$_7$(n) | H | NHCOCH$_2$OCH$_3$ | blue |
| 59 | C$_6$H$_5$ | C$_4$H$_9$(n) | C$_4$H$_9$(n) | H | NHCOCH$_2$OCH$_3$ | blue |
| 60 | C$_6$H$_5$ | C$_2$H$_5$ | C$_2$H$_5$ | H | NHCOCH$_2$OC$_2$H$_5$ | blue |
| 61 | C$_6$H$_5$ | C$_2$H$_5$ | C$_2$H$_5$ | H | NHCOCH$_2$Cl | blue |
| 62 | C$_6$H$_5$ | C$_2$H$_5$ | C$_2$H$_5$ | H | NHCOCH$_2$CN | blue |
| 63 | C$_6$H$_5$ | C$_2$H$_5$ | C$_2$H$_5$ | H | NHCOCH$_2$OC$_6$H$_5$ | blue |

We claim:
1. A compound of the formula

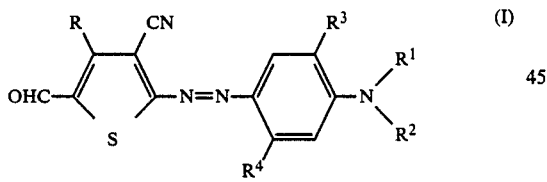

where R is phenyl or naphthyl;

R$^1$ and R$^2$ are each selected from the group consisting of methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3,-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-β-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl and 2-benzoylethyl, and one of R$^1$ and R$^2$ may be hydrogen, R$^3$ is hydrogen, methyl, methoxy, ethoxy or chlorine and R$^4$ is selected from the group consisting of methylcarbonylamino, ethylcarbonylamino, n- and isopropylcarbonylamino, n-, iso- and sec-butylcarbonylamino, benzylcarbonylamino, benzoylamino, o-, m- and p-methylbenzoylamino, o-, m- and p-chlorobenzoylamino, o-, m- and p-methoxybenzoylamino, o-, m- and p-nitrobenzoylamino, methylsulfonylamino, ethylsulfonylamino, propylsulfonylamino, methoxymethylcarbonylamino and ethoxy-, phenoxy-, cyano-, chloro- and bromomethylcarbonylamino.

2. A compound as claimed in claim 1, wherein R is phenyl, $R^1$ and $R^2$ are each allyl, benzyl, phenylethyl or $C_1$–$C_4$-alkyl which is unsubstituted or substituted by hydroxyl, cyano, $C_1$–$C_4$-alkanoyloxy, $C_1$–$C_4$-alkoxycarbonyl or $C_1$–$C_4$-alkoxy, and one of said radicals may be hydrogen, $R^3$ is hydrogen, methyl, methoxy or ethoxy and $R^4$ is $C_1$–$C_4$-alkanoylamino, methoxy-, ethoxy-, phenoxy-, cyano- or chloromethylcarbonylamino, $C_1$–$C_4$-alkylsulfonylamino or benzoylamino.

* * * * *